United States Patent
Alen et al.

(10) Patent No.: US 10,218,701 B2
(45) Date of Patent: Feb. 26, 2019

(54) SYSTEM AND METHOD FOR SECURING ACCOUNT ACCESS BY VERIFYING ACCOUNT WITH EMAIL PROVIDER

(71) Applicant: Avaya Inc., Santa Clara, CA (US)

(72) Inventors: Anand Bernard Alen, Flower Mound, TX (US); Aparna Govindaraju, Plano, TX (US); Balasubramaniam Palanisamy, Irving, TX (US); Bharanidharan Ramachandran, Irving, TX (US); Gregory Alan Johns, Highland Village, TX (US); Kathiresan Deivasagayam, Irving, TX (US); Ramakanth Damodaram, Irving, TX (US); Prem Sumetpong, Hazlet, NJ (US)

(73) Assignee: Avaya Inc., Santa Clara, CA (US)

( * ) Notice: Subject to any disclaimer, the term of this patent is extended or adjusted under 35 U.S.C. 154(b) by 121 days.

(21) Appl. No.: 15/065,557

(22) Filed: Mar. 9, 2016

(65) Prior Publication Data
US 2017/0264611 A1   Sep. 14, 2017

(51) Int. Cl.
*G06F 7/04* (2006.01)
*H04L 29/06* (2006.01)

(52) U.S. Cl.
CPC .......... *H04L 63/10* (2013.01); *H04L 63/0884* (2013.01); *H04L 63/126* (2013.01)

(58) Field of Classification Search
CPC .... H04L 63/10; H04L 63/126; H04L 63/0884
USPC .............................................................. 726/9
See application file for complete search history.

(56) References Cited

U.S. PATENT DOCUMENTS

| | | | | |
|---|---|---|---|---|
| 2011/0145907 A1* | 6/2011 | Chua | .................. | H04L 63/0807 726/7 |
| 2013/0091585 A1* | 4/2013 | Dumais | ................. | H04L 63/126 726/27 |
| 2014/0082363 A1* | 3/2014 | Lee | ......................... | H04L 51/04 713/170 |
| 2015/0180822 A1* | 6/2015 | Mathias | .............. | H04M 7/0057 709/206 |

* cited by examiner

*Primary Examiner* — Mohammad W Reza
(74) *Attorney, Agent, or Firm* — Sheridan Ross P.C.

(57) ABSTRACT

Methods and systems are provided for automatically securing account access by verifying account information with an email provider. The methods and systems automatically determine whether provided login identification and account information, in the form of an email address, is valid by a server requesting validation information from the email server of the email address. The request is automatically provided, as a background process, in response to receiving login credential information entered by a user. The email server can provide verification of the email address, whether a password associated with the email address has changed, or if the request bounces. Push notifications may be utilized by the email server to notify registered entities of any changes to login credential information associated with an account. The methods provided secure account access and active sessions subsequent to an email account owner changing a password or terminating the email account.

20 Claims, 8 Drawing Sheets

US 10,218,701 B2

SYSTEM AND METHOD FOR SECURING ACCOUNT ACCESS BY VERIFYING ACCOUNT WITH EMAIL PROVIDER

FIELD

The present disclosure is generally directed to information technology network security, in particular, toward the verification of user account information in network interactions.

BACKGROUND

Many websites and network applications allow users to login to a particular account or site utilizing one or more authentication or authorization schemes. As part of the login process, a user may be required to present a token, username, and/or password to access one or more resources associated with a site. In some cases, the username may correspond to an email address associated with a user. For instance, the user may provide an email address username during registration with the site. This email address may be verified using various procedures and/or protocols. Verification may include sending a one-time registration/validation email to the email address provided to verify the user has access to the email address. Once verified, the user may be allowed access to the site via the identity associated with the email address username.

DETAILED DESCRIPTION

Figure 1:
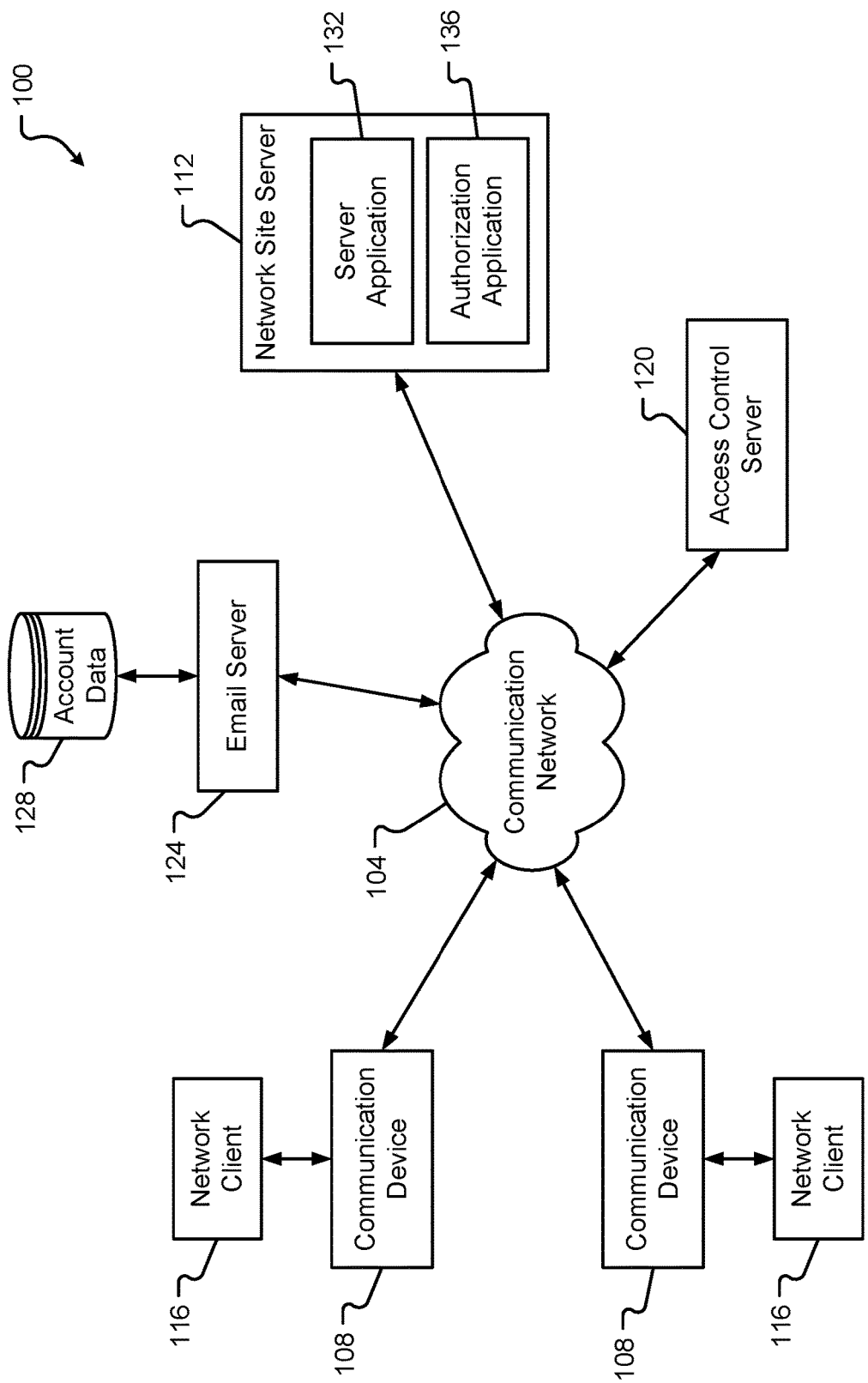
FIG. 1 depicts a block diagram of a communication system in accordance with at least some embodiments of the present disclosure.

Embodiments of the present disclosure will be described in connection with the execution of a network site server. The network site server may be configured to receive and manage communications between one or more communications and resources of the network site server. The resources may be one or more of unprotected or protected resources. A protected resource may require authorization, or a particular type of authorization, of an account before access to the protected resource is granted by the network site server. Examples of protected resources may include, but are in no way limited to, private information sites, paid-for access areas, nonpublic sites, and/or other restricted access areas hosted by the network site server. An unprotected resource may not require authorization, or may only require a first type of basic authorization, of an account to access the unprotected resource. Examples of unprotected resources may include, but are not limited to, general information pages, public sites, and/or other unrestricted access areas hosted by the network site server.

Several systems use an email address of a user to identify the user uniquely in the system. When the user then changes his or her email address there is no automatic and consistent way these systems learn of the change and protect or disable access to that user's account within the system. To illustrate this problem, personal and commercial use cases are described herein.

In a personal use case context, a person may have one or more social media account on Facebook®, LinkedIn®, or Twitter® social networking systems and/or sites. Typically these social media systems identify the user at account creation initially and subsequently at login using their email address. It is very normal for the email address to be used as the sign in or username. Note that these email addresses are not provided and managed by the social media systems but rather by a different system (e.g., an email provider, etc.). Most prevalent personal email provider systems are operated by Google®, Yahoo®, and MSN® to name a few. The user can independently and unbeknownst to the social media system deactivate their email account, change the password for their email account or the email account can be locked or disabled by the email account provider. Subsequent to this event, the user's social media account access is unaffected. It is conceivable that regardless of why the user's email account was modified, allowing access to the social media account that uses the now possibly defunct email address creates a security and/or privacy issue.

In a commercial use case context, a scenario may exist between a supplier company and a reseller company. The reseller's company may have a relationship with the supplier, where the reseller receives specific discounts due to an agreement or other contractual obligation between the two companies. The reseller may have access to and be able to use the systems of the supplier by logging into the supplier's system using a username that is an email address provided by the reseller company. In the event that the reseller leaves the employ of the reseller company (e.g., the reseller quits, retires, or is terminated from employment, etc.), it is expected that the email account at the reseller company will be deactivated and the email address archived or deleted. However, the supplier's system has no knowledge of this event. For instance, the supplier's system is unaware that the email account is no longer associated with a current employee of the reseller, but the username is still registered with the supplier's system. Therefore, the reseller may be able to log into the supplier's system using the username, which is associated with a defunct email address, and continue to avail discounts and/or maintain access to other sensitive information even though the reseller is no longer employed with the reseller company and does not qualify for those discounts or access.

Other systems fail to provide an adequate solution to this ever-increasing problem. Account verification typically includes a user providing his or her email address to the system during an initial sign up or registration. In response, the system may send a verification email to the provided email address. If the user is unable to receive that email and follow a link back into the system or supply a passcode provided in the email back to the system, the account is invalidated or not operational with full functions.

At least one limitation to this type of access control is that the verification is done by the system only when the account is first created. Subsequent to the account creation, if the email account is disabled, assigned to another user, or the user changes the password of the email account—expressing the need to disallow any session that was established using the prior password from operating on the account—there is no update to the system. Some systems achieve a higher level of security by sending a passcode to the user's email address during the login process. This is known as the two-factor authentication process. However, this method is inconvenient as it is employed every time the user attempts to login and therefore many users do not prefer to use this method in a consistent manner—thereby security remains compromised. As can be appreciated, conventional account verification is limited quite severely as implementing a solution to prevent misrepresentation by misuse of email only at the point of account creation and failing to prevent misuse at all points thereafter is practically useless.

It is with respect to the above issues and other problems that the embodiments presented herein were contemplated. Among other things, the present disclosure solves these and other issues by providing an account verification system that when a user attempts to log into a system that uses the email address of the user as the user's identity (sign-in) or contact address, the system automatically consults with the email provider of that email address before the user is ultimately authorized to use the system or critical functions of the system. Embodiments disclosed herein describe this consultation between the system and the email provider.

In one embodiment, an email provider may be asked if the email address used as the identity for the user or contact address of the user is valid, or still valid. Additionally or alternatively, the email provider may also be asked if the password associated with the email address was changed since the last time the system consulted with the email provider.

In one embodiment, the system consults with the email provider to determine whether the email address is valid. For example, the system may establish an SMTP connection to the email provider's SMTP system/server and may use SMTP RCPT TO or alternatively, SMTP VRFY. As known to those in the art, an SMTP connection to the mail system for the email domain is established by a SMTP handshake and the email address can be verified using the series HELO|EHLO/VRFY/QUIT or HELO|EHLO/MAIL FROM/RCPT TO/QUIT. This series will succeed if the email address is present and is active at the email provider's domain. The SMTP verification will fail if the email address is no longer valid for any reason.

A reasonable timeframe may be set for the above handshake and verification series to complete with a response upon which the user is allowed access to the system. The system can choose to implement this verification in-line with login processing or in the background. If used in-line with login processing, the user is not allowed to login successfully till the described validation is completed successfully. If used in the background, the system may allow the user to login successfully but then interrupt and terminate the user's session upon verification failure or disallow access to critical functions of the system till background validation has completed successfully.

In some embodiments, the system consults with the email provider to determine whether the password has been changed since the last consult. This consultation may be made by the system in addition to determining the validity of the email address at the email domain. In this example, the system may use ESMTP extensions that allow for additional custom parameters, often known to those in the art as "vendor specific parameters," to be received in the response from the email provider. The actions of the email provider upon receipt of the second request from the system may include the email provider associating a 'password-changed' flag per system that it may send in response to a request or query. This flag may be set to true when the user changes his or her password. When using the ESMTP extensions to respond, the current state of the flag may be provided in the response by the email provider. After responding to the request by the system, or server, this flag may be reset to false (e.g., to denote that the consulting system has been notified that the password was changed since last consult).

In any event, the system may consult with the email provider every time the user attempts to log into the system or at other times. For instance, the system may consult with the email provider "every so often" or at various time periods. In this case, the system may consult "every so often" by skipping a number of login attempts or consulting again only after expiration of a period of time, etc. In some embodiments, the system may allow an administrator of the system to specify this "every so often" implementation method and/or other parameters associated typically with such methods, such as time duration between checks or how many login attempts to allow without a check or a date or time when the checks should be done, etc.

In another embodiment, the system may register with the email provider and can be notified when either the email address is invalidated, reassigned, or barred for any reason. In one embodiment, the system may register to be notified in the event of a password change associated with the email address. It should be appreciated that the system is not provided the password, but is provided information whether the password was changed. Password expires, resets, and nullification may all be considered as password changes.

In some cases, the email provider may notify the system of invalidation of the email address or password change via a push notification. In any event, one or more of the registration methods described herein may be built on push notification systems.

In yet another embodiment, the system may monitor whether an email sent by the system to the email address of the user bounces, or is returned as undeliverable. If the email bounces the system can reject a subsequent login request.

As can be appreciated, one or more of the consult methods, the registration methods, and the email bounce method may be considered as separate methods and may also be used in conjunction with each other. For instance, the system may use the method to consult with the email provider if the email account is valid in the same system where the system has registered for receiving the password change notification. All combinations are valid and hereby disclosed.

It is worthwhile to note that social media systems such as Facebook®, LinkedIn®, and Twitter® not only use email addresses to log users into their own systems but several other third party applications use an authorization protocol, such as the OAuth open standard for authorization providing secure delegated access to server resources on behalf of a resource owner, provided by these systems to log users into their own respective systems. An example of this is where a user logs into her utility company's billing system to pay her utility bill and uses the "Login through Facebook" method. In this scenario, there are two systems, the utility company's system and then the social media system providing the OAuth service. Note that the present disclosure may apply to both systems and any method described herein may be used completely by one system or the other or shared between the two systems to detect scenarios where the user's email address is no longer associated with the user or the user has changed the password for his or her email address. In the event that embodiments of the present disclosure are implemented by the social media systems, there is a massive security enhancement benefit as all dependent systems that use the defunct email address end up automatically terminating sessions that may be insecure. This benefit is easily illustrated with the lost mobile phone use case, where in this event, the user simply has to change their primary email password and all social media apps, and other apps such as banking apps that use a social media provided OAuth service or the user's email address are automatically logged out protecting access to all the apps from whoever may find the phone.

Moreover, using any method or methods disclosed herein, in the event that the system discovers an email is no longer valid at the email provider or assignment has been changed or the password has been changed, the system will fail the login process and take corrective action. Corrective actions are to invalidate sessions that are saved (operate without the user requiring to re-login) so that the user is required to resupply his or her password to login again. This corrective action applies when the email address is still valid, but the password was changed by the user for his or her email address at the email provider. The corrective action may require the user to supply his or her new email address where the existing email address with the system is not valid according to the email provider. It is expected that in implementing this corrective action, systems may use the two-factor authentication method and verify ownership of the newly supplied email address.

Embodiments include a communication system, comprising: a server, comprising: a microprocessor; and a computer readable medium coupled to the microprocessor and comprising instructions stored thereon that cause the microprocessor to: determine, based on login credentials presented to the server, an email address of a user associated with the login credentials; send, across a communication network, a validation request to an email server associated with the email address of the user, wherein the validation request is configured to generate a validation response by the email server when the email address of the user is valid; automatically generate an access token associated with the user when the validation response is received by the server, wherein the access token enables access to a protected resource by a communication device of the user during a lifetime of the access token, and wherein the protected resource is unavailable to the communication device of the user without the access token; and prevent access to the protected resource by the communication device of the user when the validation response is not generated by the email server or received by the server.

Aspects of the above communication system include wherein the validation request is a message configured to query the email server whether a password for the email address has changed between a first validation time and a second validation time. Aspects of the above communication system include wherein the validation request is an email sent by the server to the email address of the user. Aspects of the above communication system include wherein the validation request is configured to generate an invalidation response by the email server when the email address of the user is invalid. Aspects of the above communication system include wherein the invalidation response is a bounce message. Aspects of the above communication system include a network interface that enables the microprocessor to present the access token to the communication device of the user. Aspects of the above communication system include wherein the microprocessor is further caused to: allow access to an unprotected resource of the server by the communication device of the user until the invalidation response is received by the server. Aspects of the above communication system include wherein the lifetime of the access token corresponds to one or more of a time associated with a single communication session established between the communication device of the user and the server or a predetermined period of time. Aspects of the above communication system include wherein the access token associated with the user when the validation response is generated by the email server and received by the server. Aspects of the above communication system include wherein the protected resource is a resource of the server. Aspects of the above communication system include wherein the validation request is an SMTP RCPT TO message. Aspects of the above communication system include wherein the validation request is an SMTP VRFY message.

Embodiments include a method, comprising: receiving, by a microprocessor, login credentials from a communication device of a user; determining, by the microprocessor and based on the login credentials received, an email address of the user associated with the login credentials; sending, by the microprocessor, a validation request to an email server associated with the email address of the user; receiving, by the microprocessor, a response from the email server indicating whether the email address of the user is valid; and generating, automatically by the microprocessor, an access token associated with the user when the response indicates the email address of the user is valid, wherein the access token enables access to a protected resource by the communication device of the user during a lifetime of the access token, and wherein the protected resource is unavailable to the communication device of the user without the access token.

Aspects of the above method include preventing, automatically by the microprocessor, access to the protected resource of the server by the communication device of the user when the response indicates the email address of the user is invalid. Aspects of the above method include wherein the validation request is sent to the email server and not to the email address of the user. Aspects of the above method include wherein the validation request is a registration message requesting the server receive push notifications from the email server when any changes are made to the email address or a password of the email address of the user. Aspects of the above method include wherein the validation request is an email sent by the server to the email address of the user. Aspects of the above method include wherein the response is a bounce message, the bounce message indicating that the email address of the user is invalid. Aspects of the above method include allowing, by the microprocessor, access to an unprotected resource of the server by the communication device of the user until an invalidation response is received by the server. Aspects of the above method include wherein the lifetime of the access token corresponds to one or more of a time associated with a single communication session established between the communication device of the user and the server or a predetermined period of time. Aspects of the above method include wherein changes are made to the email address and a push notification is sent as part of the response indicating that the email address of the user is invalid. Aspects of the above method include performing, by the microprocessor, a corrective action, the corrective action comprising one or more of removing the email address of the user from a registration database of the server, logging the user out of a user account on the server, or reporting an unauthorized login attempt by the invalid email address. Aspects of the above method include wherein the protected resource is a resource of the server. Aspects of the above method include wherein the validation request is an SMTP RCPT TO message. Aspects of the above method include wherein the validation request is an SMTP VRFY message.

Embodiments include a server, comprising: a processor; and a computer-readable medium, coupled with the processor, the computer-readable medium comprising instruction sets that are executable by the processor, wherein the instruction sets cause the processor to: receive login credentials provided in an account authorization between a communication device of a user and the server; determine, based on login credentials, an email address of the user associated with the account; send, across a communication network, a validation request to an email server associated with the email address of the user, wherein the validation request is configured to generate a validation response by the email server when the email address of the user is valid; automatically create an access token associated with the user and the account when the validation response is received by the server, wherein the access token enables access to a protected resource by the communication device of the user during a lifetime of the access token, wherein the protected resource is unavailable to the communication device of the user without the access token; and prevent access to the protected resource by the communication device of the user when the validation response is not generated by the email server or received by the server.

Aspects of the above server include wherein the account authorization between the communication device of the user and the server is an open authorization protocol, and wherein the login credentials are determined from an authorization token provided as part of the open authorization protocol.

Referring to FIG. 1, a block diagram of a communication system 100 is shown in accordance with at least some embodiments of the present disclosure. The communication system 100 of FIG. 1 may be a distributed system and, in some embodiments, comprises a communication network 104 connecting communication devices 108 with a network site server 112. The communication system 100 may include, but is not limited to, an access control server 120, and an email server 124. In some embodiments, a communication device 108 may communicatively connect with the network site server 112 via a network client 116, or web client, running on the communication device 108. For example, the network client 116 may be an application running on the communication device 108 that is configured to send and receive information with the server application 132, or web server software. The network site server 112 may host information, provide access to one or more resources, and/or otherwise deliver digital content to one or more communication devices 108 having valid account information.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. The communication network 104 may comprise a number of different communication media such as coaxial cable, copper cable/wire, fiber-optic cable, antennas for transmitting/receiving wireless messages, and combinations thereof.

The communication devices 108 may correspond to at least one of a smart phone, tablet, personal computer, and/or some other computing device. Each communication device 108 may be configured with an operating system ("OS") and at least one communication application. The communication application, or network client 116, may be configured to exchange communications between the communication device 108 and another entity (e.g., a network site server 112, access control serve 120, an email server 124, another communication device 108, etc.) across the communication network 104. Additionally or alternatively, communications may be sent and/or received via the communication device 108 as a telephone call, a packet or collection of packets (e.g., IP packets transmitted over an IP network), an email message, an instant message ("IM"), an SMS message, an MMS message, a chat, and/or combinations thereof. In some embodiments, the communication device 108 may be associated with one or more users in the communication system 100.

The network site server 112 may include hardware and/or software resources that, among other things, provide the ability to deliver content, control access, store information, and/or otherwise provide communications between entities in the communication system 100. The communication management server 112 may include a server application 132 and an authorization application 136 to name a few.

In some embodiments, the server application 132 may provide an interface and/or other application programming by which one or more communication devices 108 can communicate with resources of the network site server 112. The server application 132 may grant or deny access to one or more resources of the network site server 112 based on login information and account verification disclosed herein. Additionally or alternatively, the server application 132 may be configured to verify information exchanged between the authorization application 136 and/or the access control server 120 and an email server 124 or communication device 108.

In one embodiment, the network site server 112 may include an authorization application 136. The authorization application 136 may be configured to interact with the email server 124 or access control server 120. For instance, the authorization application 136 may receive login credentials from communication device 108 interaction with the server application 132 of the network site server 112. Upon receiving this information, the authorization application 136 may determine that the login credentials are associated with an account of the network site server 112. Additionally or alternatively, upon receiving login credentials, the authorization application 136 may determine an appropriate email server 124 associated with the credentials. In one embodiment, the authorization application 136 may generate a validation request for the credentials and send the request to the determined email server 124. The authorization application 136 may receive validation responses from the email server 124. In some embodiments, the requests and/or responses may be handled by one or more components of the access control server 120.

The access control server 120 may include one or more components configured to provide secure account access by verifying account information with the email server 124. Although depicted as being separate from the network site server 112, it should be appreciated that the one or more components of the access control server 120 may be included in the network site server 112 or the one or more components of the network site server 112 may be included in the access control server 120. As can be appreciated, the various modules, applications, and/or components described in conjunction with the network site server 112 and/or the access control server 120 may be part of a single server. Additional details of the access control server 120 are described in conjunction with FIG. 2.

The email server 120 may correspond to any server that is configured to run software for sending, receiving, and storing electronic mail messages. Email servers 124 may include, but are in no way limited to, the servers associated with business, commercial, private, and/or public email accounts. The email server 124 may include an account data memory 128 for maintaining username, password, and/or other credential information that is associated with an email account provided by the server 124. In some cases this account information may be arranged in a list, database, secure memory, and/or combinations thereof.

Figure 2:
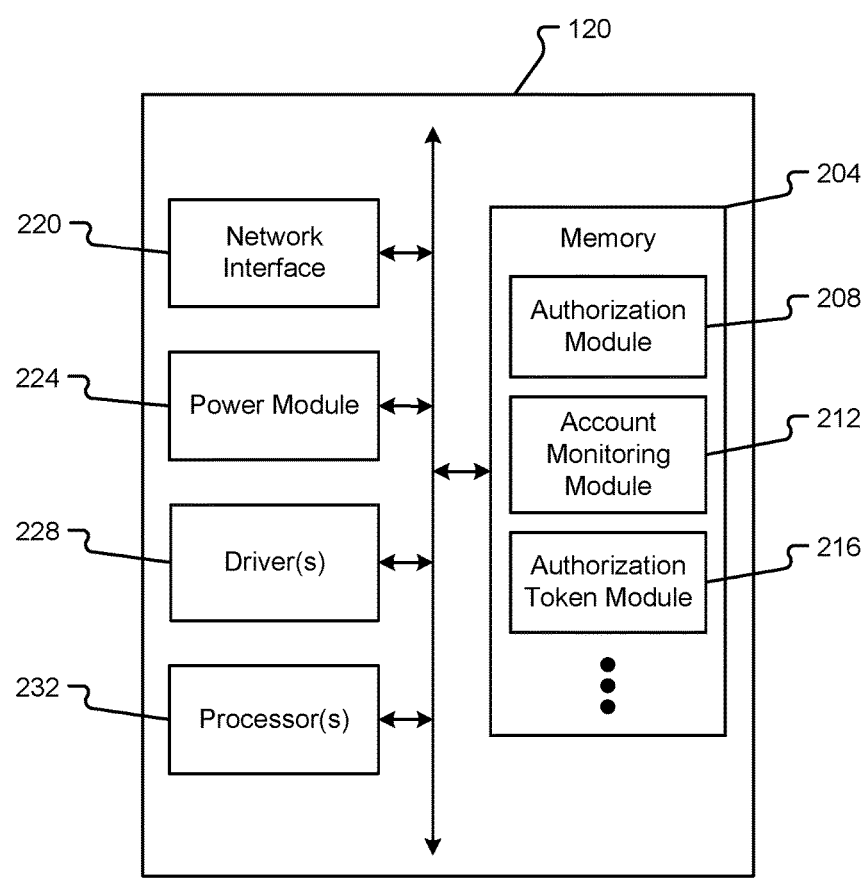
FIG. 2 is a block diagram depicting components of a server used in a communication system in accordance with at least some embodiments of the present disclosure.

FIG. 2 is a block diagram depicting components of a server used in the communication system 100 in accordance with at least some embodiments of the present disclosure. While illustrated as the access control server 120, it should be appreciated that the components shown in FIG. 2 may correspond to one or more components of the network site server 112 or some other server in the system 100. Additionally or alternatively, the various components described in conjunction with any of the servers 112, 120 disclosed herein may be associated with a particular single server 112, 120 or distributed between multiple separate servers 112, 120. In any event, the access control server 120 is shown to include a computer memory 204 that stores one or more instruction sets, applications, or modules, potentially in the form of an authorization module 208, an account monitoring module 212, and/or an authorization token module 216. Although not shown, the access control server 120 may further include other components of the various servers depicted in FIG. 1 including, without limitation, the network site server 112. In other words, the access control server 120 may be configured as a server, or part of a server, that includes any or all of the components of the communication system 100 depicted in FIG. 1. The access control server 120 is also shown to include one or more of a network interface 220, a power module 224, drivers 228, and a processor 232.

The memory 204 may correspond to any type of non-transitory computer-readable medium. In some embodiments, the memory 204 may comprise volatile or non-volatile memory and a controller for the same. Non-limiting examples of memory 204 that may be utilized in the tag management server 132 include RAM, ROM, buffer memory, flash memory, solid-state memory, or variants thereof. Any of these memory types may be considered non-transitory computer memory devices even though the data stored thereby can be changed one or more times.

The applications/instructions 208, 212, 216 may correspond to any type of computer-readable instructions or files storable in the memory 204. The functionality of the authorization module 208, account monitoring module 212, and/or an authorization token module 216, may be similar or identical to the functionality provided by the authorization application 136 of the network site server 112.

The authorization module 208 may be configured to receive and analyze credential information provided by a user to a server application 132 of a network site server 112. In one embodiment, the authorization module 208 may determine that the credential information includes an email address associated with registered user account. Using the email address, the authorization module 208 may send a request (e.g., a MAIL FROM request, an email, and/or some other message) to the email server 124 associated with the email address. The email server 124 may respond to the request by providing a response (e.g., a RCPT TO response, a bounced email response, a message-received response, and/or some other response message) to the authorization module 208. The request-response process may be used to validate whether an email address (e.g., one that is used to login or attempt to login to the network site server 112) is valid, or still valid since last login.

In some embodiments, the authorization module 208 may report information regarding login attempts, whether successful or unsuccessful, made by an account to the network site server 112. In one embodiment, this report may be sent by the authorization module 208 in the form of an email delivered from the access control server 120 (e.g., via the network site server 112, the server application, and/or some other component of the system 100) to a communication device 108.

The account monitoring module 212 may be configured to receive notifications from an email server 124 regarding any changes to an email address, email address user, and/or password for the email address. In one embodiment, the access control server 120 may register to receive the notifications of any changes to the credential information. The notifications may be provided as push notifications via a notification service associated with the email server 124. When the account monitoring module 212 receives notification of a change in any of the credential information, the module 212 may communicate with the authorization module 208 to take corrective action. Corrective action may include prompting the user for new login credentials and/or login information. Additionally or alternatively, the corrective action may include removing, booting, or kicking, a user that is logged into the network site server 112. The corrective action may include blacklisting or removing the email address and/or user account information from a registered member memory associated with the network site server 112.

The authorization token module 216 may be configured to generate, amend, grant, and/or revoke tokens associated with access control for an account. In some embodiments, the authorization token module 216 may analyze tokens issued under a particular authorization protocol (e.g., OAuth, etc.) for credential information or other identification information. Once analyzed, the authorization token module 216 may provide the relevant credential information (e.g., an email address, etc.) to the authorization module 208 for making access control decisions according the methods described herein.

The network interface 220 may comprise hardware that facilitates communications with other communication devices over the communication network 104. The network interface 220 may include an Ethernet port, a Wi-Fi card, a Network Interface Card (NIC), a cellular interface (e.g., antenna, filters, and associated circuitry), or the like. The network interface 220 may be configured to facilitate a connection between the access control server 120 and the communication network 104 and may further be configured to encode and decode communications (e.g., packets) according to a protocol utilized by the communication network 104.

The power module 224 may include a built-in power supply (e.g., battery) and/or a power converter that facilitates the conversion of externally-supplied AC power into DC power that is used to power the various components of the access control server 120. In some embodiments, the power module 224 may also include some implementation of surge protection circuitry to protect the components of the access control server 120, or associated server, from power surges.

The driver(s) 228 may correspond to hardware, software, and/or controllers that provide specific instructions to hardware components of the access control server 120, thereby facilitating their operation. For instance, the network interface 220, power module 224, and/or memory 204 may each have a dedicated driver 228 that provides appropriate control signals to effect their operation. The driver(s) 228 may also comprise the software or logic circuits that ensure the various hardware components are controlled appropriately and in accordance with desired protocols. For instance, the driver 228 of the network interface 220 may be adapted to ensure that the network interface 220 follows the appropriate network communication protocols (e.g., TCP/IP (at one or more layers in the OSI model), TCP, UDP, RTP, GSM, LTE, Wi-Fi, etc.) such that the network interface 220 can exchange communications via the communication network 104. As can be appreciated, the driver(s) 228 may also be configured to control wired hardware components (e.g., a USB driver, an Ethernet driver, fiber optic communications, etc.).

The processor 232 may correspond to one or many microprocessors that are contained within a common housing, circuit board, or blade with the memory 204. The processor 232 may be a multipurpose, programmable device that accepts digital data as input, processes the digital data according to instructions stored in its internal memory, and provides results as output. The processor 232 may implement sequential digital logic as it has internal memory. As with most microprocessors, the processor 232 may operate on numbers and symbols represented in the binary numeral system.

Figure 3:
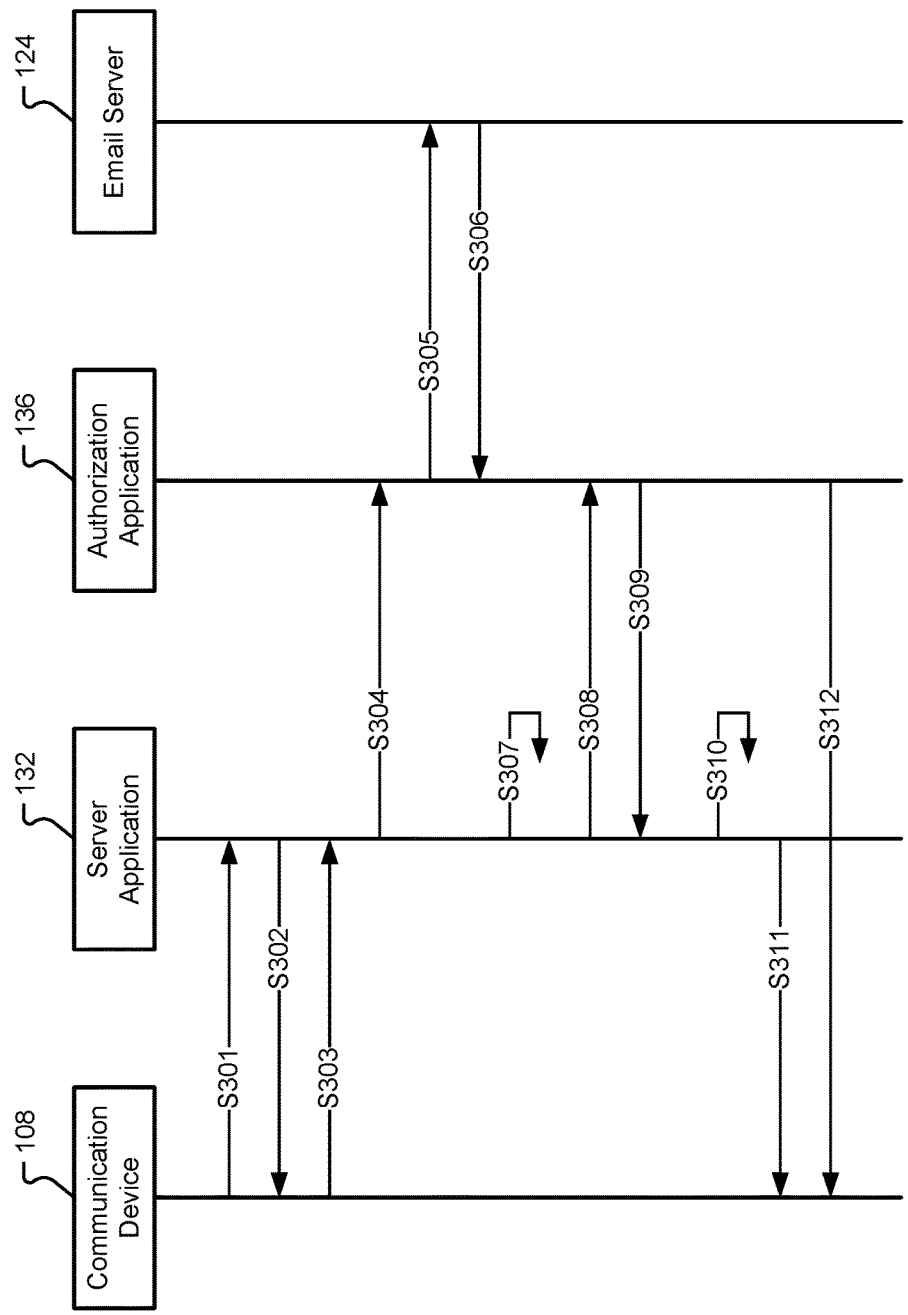
FIG. 3 is a diagram depicting a first set of communication flows in accordance with at least some embodiments of the present disclosure.

With reference now to FIG. 3, a first set of communication flows will be described in accordance with at least some embodiments of the present disclosure. The communication flows begin when a communication device 108 of a user enters a uniform resource locator (URL) into a web client or other network client of the device 108 (step S301). In some embodiments, the communication flows begin when a communication device 108 of a user visits a website. In any event, the communication device 108 may follow the URL and/or interact with or access a server application 132, for example, of a network site server 112.

The server application 132 may be configured to deliver various content to the communication device 108. For instance, in response to a user interacting with the website, the server application 132 may present an authorization user interface (UI) to the communication device 108 of the user (step S302). The authorization UI may include one or more fields in which a user may enter credentials information. The credentials information may include, but is in no way limited to, a username, user identification, password, code, verification, etc., and/or other user-specific site access information. In some embodiments, the credentials information may be used by one or more modules, applications, servers, etc., in the system 100 to grant or deny communication device 108 access to resources of the network site server 112. This access may be based on a verification of the credentials. In one embodiment, verification may include providing a first access for a first verification result, a second access for a second verification result, and so on.

By way of example, a user may provide credentials that allow the communication device 108 to login to an area of the network site server 112. Logging into the network site server 112 may correspond to the first access. As such, the first verification result may be made in response to comparing the credentials information to login information stored in a lookup table associated with the server 112. The first access may allow a user to login to the server application 132 and access general login resources of the server 112.

The second access may be associated with certain protected resources of the server 112, and as such, may require additional analysis and/or verification of the credentials as described herein. In some embodiments, the resources described herein may correspond to websites, areas, content, and/or other information hosted by the server 112. General login resources may include a general information site, a webpage having restricted links or URLs, etc., and/or a network site server 112 user interface providing restricted access to areas of the server 112. Protected resources may include, but are in no way limited to, secure network sites, secure content, private information, non-public information, paid-for content, and/or other webpages, sites, or areas that are further restricted above the general login resources.

In any event, the communication device 108 may present the credentials for login to the server application 132 at step S303. The server application 132 may then submit the credentials for login to an authorization application 136 or access control server 120 (step S304). Although the methods for secure verification are described in conjunction with the authorization application 136, it should be appreciated that the access control server 120 may perform the methods disclosed herein. The authorization application 136 may extract information from the credentials to securely verify an identity of the user associated with the credentials. For instance, the authorization application 136 may determine that the credentials are associated with a particular email address of the user. In one embodiment, the email address may be a part of the credentials (e.g., a username, etc.). The username may be a user's identity attached to a particular email server (e.g., "useridentity@emailserver.com"). In another embodiment, the email address may be stored in a user directory memory or lookup table of the server 112. In this example, the username of the credentials may be a unique identification (e.g., "useridentity1234ABC," etc.). Using the unique identification, an email address associated with the user may be retrieved from a memory of the server 112. For example, the authorization application 136 may refer to the user directory memory using this unique identification of the credential information to automatically select the user's email address stored therein.

Once the email address of the user is determined, the authorization application 136 may send a validation request to the email server 124 associated with the email address (step S305). As described herein this validation request may take a number of forms. In one embodiment, the validation request may be part of an electronic mail transfer protocol (e.g., SMTP, ESMTP, etc.) request. For instance, the validation request may correspond to a MAIL request including "MAIL FROM" followed by appropriate formatting and the email address determined. If accepted by the email server 124, the "MAIL FROM" request will return a "RCPT TO" response by the email server 124 (step S306). Acceptance by the email server 124 indicates that the email address included in the "MAIL FROM" validation request is indeed a valid email address associated with the email server 124. In other words, the email address has been validated by the email server 124.

In another embodiment, the authorization application 136 may send an email to the email address as the validation request (step S305). The email sent by the authorization application 136 (e.g., using an email system, etc.) is designed to determine an existence of the email address. In the event that the email address does not exist on the email server 124, the email server 124 may generate a "bounce message" to be returned to the authorization application 136 (e.g., to the email sending address of the authorization application 136 email system). The bounce message may include, but is in no way limited to, a failed delivery status notification (DSN), a non-delivery report (NDR), a non-delivery notification, etc. In some embodiments, the bounce message may be generated by the email system of the authorization application 136 when the email system of the authorization application 136 is unable to deliver a message. As can be appreciated, a failed or successful delivery notification may be received in step S306.

The server application 132 may verify and generate an authorization code based on whether the email address is validated (step S307). The server application 132 may redirect to the network site server 112 from a network client 116 with the authorization code. The server application 132 may then follow the redirect to the network site server 112. In some embodiments, the application server may present the authorization code to the authorization application 136 (step S308). In response, the authorization application 136 may return an access token to the server application 132 (step S308). Among other things, this token may allow the server application 132 to call a protected resource of the network site server 112 (step S310). The access may be provided for a period of time, a number of accesses, and/or on a conditional basis (e.g., when a user's email address or password changes, etc.). The server application 132 can then return the restricted or protected resources of the network site server 112 to the communication device 108 (step S311). This process can allow a user to access restricted or protected resources of the network site server 112 via the server application 132 and the communication device 108.

In one embodiment, the authorization application 136 may automatically generate and send an email to a recipient with data about a login attempt made to the authorizing application 136 (step S312). The data about the login attempt may be provided as a further security measure to alert one or more recipients of misappropriated credentials, unlawful login attempts, login attempts made, as a notification to remove a particular user from a registered database, etc. As shown in FIG. 3, the email is sent to the communication device 108 of the user.

Figure 4:
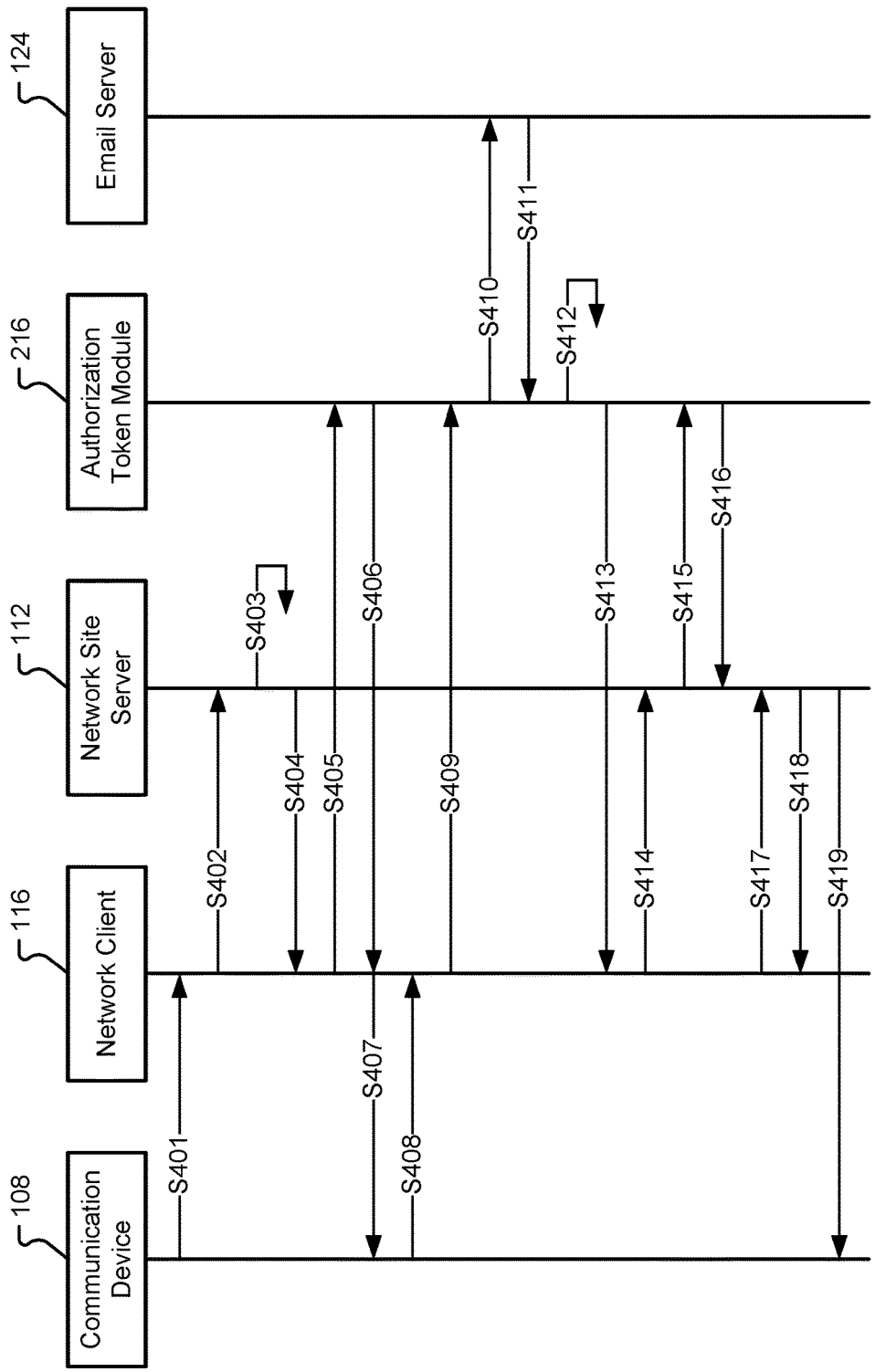
FIG. 4 is a diagram depicting a second set of communication flows in accordance with at least some embodiments of the present disclosure.

FIG. 4 shows a diagram depicting a second set of communication flows in accordance with at least some embodiments of the present disclosure. The communication flows may represent a set of communications exchanged in the present disclosure when implemented with an authorization protocol (e.g., OAuth, etc.). The communication flows begin when a user enters an URL into a communication device 108 (step S401). Entering the URL may include selecting a link, entering a website address, entering a network address, or visiting a website using the communication device 108. The URL may be opened via a network client 116 (e.g., a web/HTTP client, etc.) of the communication device 108 (step S402). Opening the URL by the network client 116 allows the communication device 108 to contact and interact with a network site server 112, as described in conjunction with FIG. 3.

Upon opening the URL, the network site server 112 may automatically initiate an authorization process using a single-sign on (SSO) authorization protocol such as OAuth or equivalent (step S403). As part of the authorization process, the network site server 112 may provide a redirect URL to the network client 116 for routing to an authorization server (step S404). For instance, the network client 116 of the communication device 108 opens the redirect URL and is directed to an authorization token module 216 or OAuth/SSO server (step S405). The authorization token module 216 may present an authorization UI to the network client 116 of the communication device 108 (step S406).

In some embodiments, this authorization UI is rendered to a display of the communication device 108 (step S407). For instance, the authorization UI may include one or more fields in which a user may enter credentials information. The credentials information may include, but is in no way limited to, a username, user identification, password, code, verification, etc., and/or other user-specific site access information.

The user may provide these credentials via the network client 116 of the communication device 108 (step S408) and the credentials are then presented to the authorization token module 216 (step S409). In one embodiment, the authorization token module 216 may and extract or determine an email address from the information presented to the authorization token module 216 by the network client 116. This process may be similar, if not identical, to the process described in conjunction with FIG. 3 above.

Upon determining the email address of the user, the authorization token module 216 sends a validation request to the email server 124 associated with the email address (step S410). The validation request may include "MAIL" requests, emails sent, or any other forms, as described herein. The email server 124 may reply to the request with a response that either acknowledges that the email address is valid or invalid (step S411). In one embodiment, the response may be sent to authorization token module 216.

The authorization token module 216 may, depending on whether a validating response is received, verify and generate an authorization code (step S412). The authorization code may be based at least partially on whether the email address was validated by the request/response between the authorization token module 216 and the email server 124.

The authorization token module 216 may then redirect to the network site server 112 from a network client 116 with the authorization code (step S413). The network client 116 may then follow the redirect to the network site server 112 (step S414). In one embodiment, the network site server 112 may present the authorization code to the authorization token module 216 (step S415). In response, the authorization token module 216 returns an access token to the network site server 112 (step S416). In one embodiment, the access token may allow access to one or more protected resources of the network site server 112. Access may be provided for a period of time, a number of accesses, and/or on a conditional basis (e.g., when a user's email address or password changes, etc.). In any event, in response to the network client 116 calling a protected resource with the access token (step S417), the network site server 112 may return the protected resource to the network client 116 (step S418). This process can allow a user to access restricted or protected resources of the network site server 112 via the network client 116 and the communication device 108 utilizing layered authorization protocols.

In one embodiment, the network site server 112 may automatically generate and send an email to a recipient with data about a login attempt made to the network site server 112 (step S419). The data about the login attempt may be provided as a further security measure to alert one or more recipients of misappropriated credentials, unlawful login attempts, login attempts made, as a notification to remove a particular user from a registered database, etc. As shown in FIG. 4, the email can be sent to the communication device 108 of the user.

Figure 5:
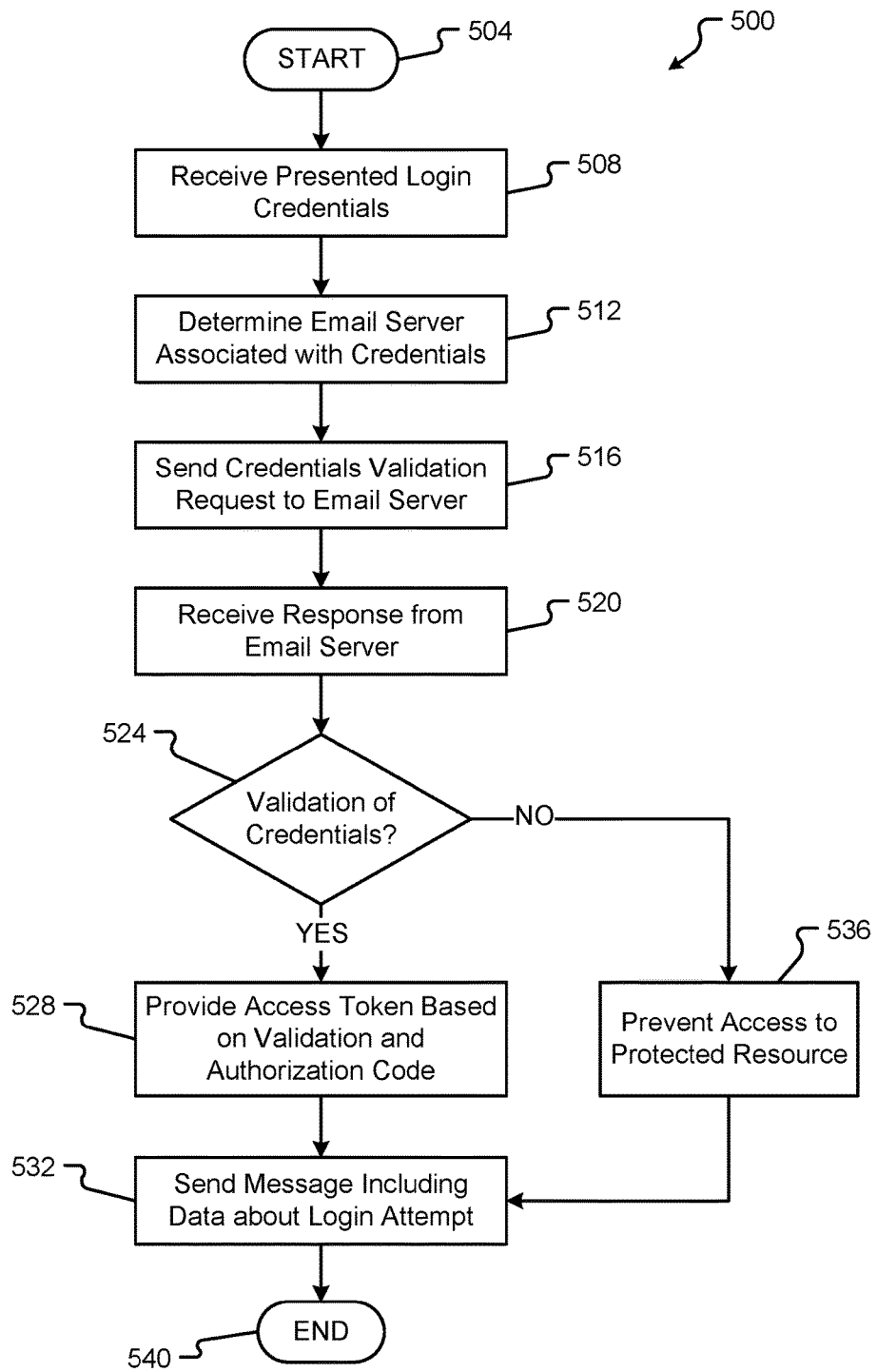
FIG. 5 is a flow diagram depicting a first method of securing account access in accordance with at least some embodiments of the present disclosure.

With reference to FIG. 5, a first method 500 of securing account access in network communications will be described in accordance with at least some embodiments of the present disclosure. The method 500 can be executed as a set of computer-executable instructions executed by a computer system and encoded or stored on a computer readable medium. Hereinafter, the method 500 shall be explained with reference to the systems, components, modules, applications, software, data structures, user interfaces, etc. described in conjunction with FIGS. 1-4. The method 500 begins at step 504 and proceeds when presented login credentials are received (step 508). In some embodiments, the login credentials may be received at an authorization application 136 or access control server 120 of a communication system 100. The login credentials may include one or more usernames, passwords, tokens, identifications, and/or any other information as provided herein.

Next, the method 500 continues by determining an email server 124 and/or email address associated with the credentials (step 512). This determination may be made by extracting an email address from a username or other identification information included in the login credentials. As can be appreciated, many usernames for websites, etc. correspond to a user's email address. In some cases, the determination may be made by referring to an account database using an identity of the user included in the login credentials. In any event, the email information is determined using the login credentials provided.

The method 500 proceeds by sending a validation request to the email address and/or email server 124 determined in step 512 (step 516). The validation request may take form of an email, message, or other information exchange between an access control or authorization application/module (e.g., running on an access control server 120, network site server 112, or other computer system, etc.) and the email server 124. For example, the validation request may be similar, if not identical, to the validation request described in conjunction with FIGS. 3 and 4 above.

In some embodiments, the method 500 may receive a response from the email server 124 (520). The response may be made by the email server 124 based on the request sent in step 516. The response may indicate whether the credentials are valid or invalid. For instance, when the request sent is a "MAIL FROM" request, the response may be a "RCPT TO" message from the email server 124. As another example, when the request sent is an email (e.g., from an authorization email address and system, etc.) to the user's email address on the email server 124, the email server 124 may respond with a "message delivered" or "message bounced" response. In yet another example, a lack of a response from an email server 124 may be considered a response from the server 124. For instance, when an email is delivered successfully, the email server 124 may not return an "undeliverable" or "bounce" message.

The method 500 proceeds by determining whether the credentials have been validated (step 524). Validation of the login credentials may include determining if an email address exists on the email server 124, is associated with a particular user, fulfills criteria required of the email address, etc., and/or combinations thereof. By way of example, a user may have been recently terminated from a company and the company may subsequently remove the user's company email address from the email server 124 (e.g., as a security measure, policy, etc.). In a traditional system, the user may continue to access sites where the user previously registered with his company email address. The methods provided herein require a validation of the email address by the email server 124 to allow access to one or more resources of a server 112. In one embodiment, the validation may only require that the email exist, or be found on a particular email server 124. In some embodiments, the validation may require that the email address has not been changed or reassigned to another user. Additionally or alternatively, the validation may require that a user's password remain unchanged, or change according to a specific timed period.

If the validation of the credentials fails (e.g., determining that a bounced message response is received, no "RCPT TO" response is received, the email address does not exist, the password associated with the email address changed, the email address was reassigned to a different user, etc.), the method 500 may proceed to step 536 where the user is prevented access to a protected resource of the server 112. This prevention may include allowing a user access only to unprotected resources of the server 112, booting the user from a session (e.g., requiring a new login to be entered and/or created), and/or removing a registration of the user and email address with the server 112. Other corrective action may be taken as further described herein.

In the event that the credentials are validated (e.g., determining that a message delivered response is received, no message failure response is received, a "RCPT TO" response is received, the email address exists, the password change rules are followed, etc.), the method 500 may proceed to provide an access token based on the validation (step 528). This access token may be based on an authorization code generated by an authorization token module 216 or server application 136, etc.

The method 500 may continue by sending a message including data about the login attempt at step 532. This message may be sent to a user, administrator, security officer, and/or other party. For example, the data about the login attempt may be provided as a further security measure to alert one or more recipients of misappropriated credentials, unlawful login attempts, login attempts made, as a notification to remove a particular user from a registered database, etc. The method 500 ends at step 540.

Figure 6:
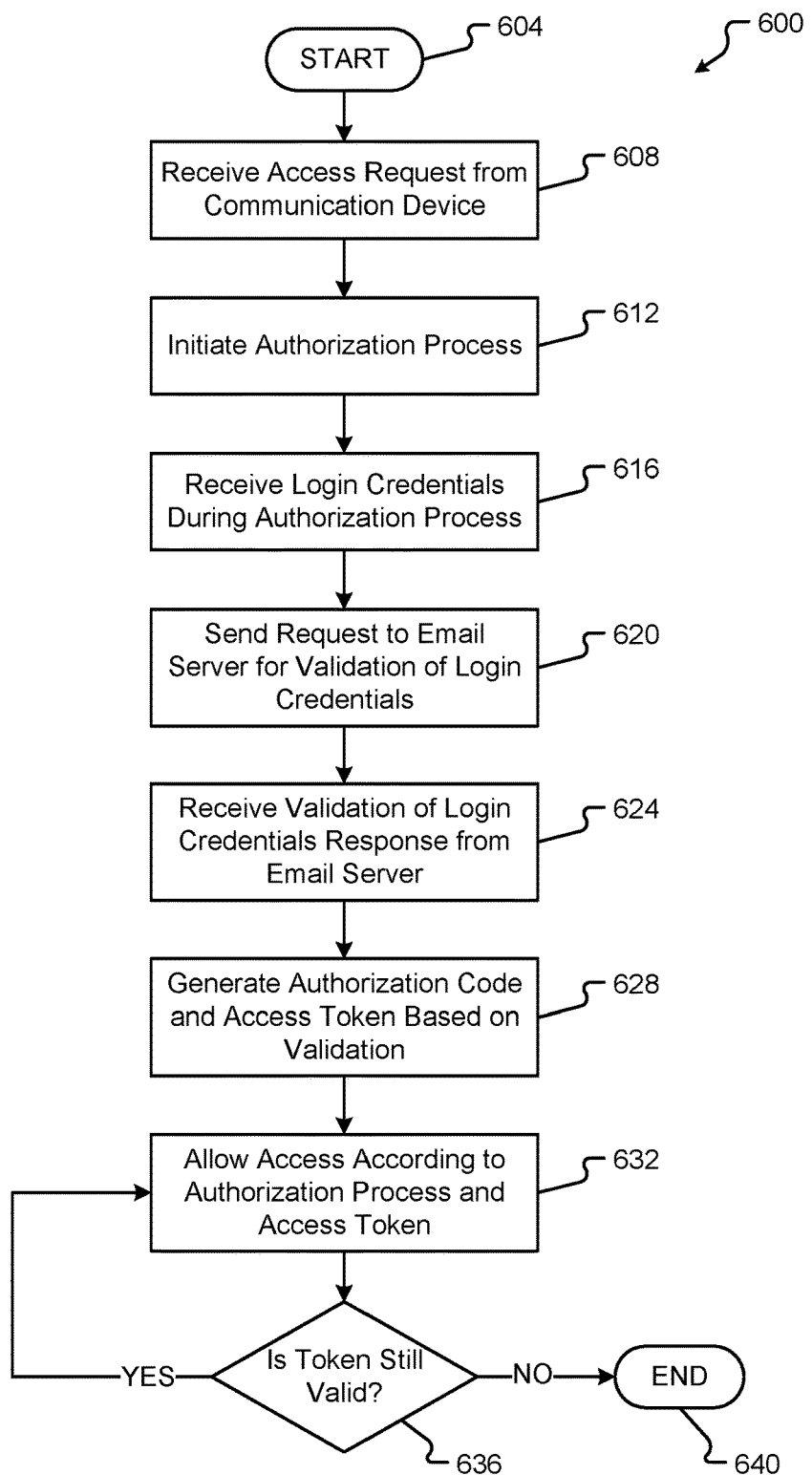
FIG. 6 is a flow diagram depicting a second method of securing account access in accordance with at least some embodiments of the present disclosure.

FIG. 6 is a flow diagram depicting a second method 600 of securing account access in accordance with at least some embodiments of the present disclosure. The method 600 can be executed as a set of computer-executable instructions executed by a computer system and encoded or stored on a computer readable medium. Hereinafter, the method 600 shall be explained with reference to the systems, components, modules, applications, software, data structures, user interfaces, etc. described in conjunction with FIGS. 1-5. The method 600 begins at step 604 and proceeds when an access request is received from a communication device 108 in a communication system 100 (step 608). In some embodiments, the access request may be made to a server 112 that utilizes an open or proprietary SSO or other authorization protocol (e.g., OAuth, SAML, etc.).

Upon receiving the access request, the server 112 may initiate an authorization process in accordance with the authorization protocol utilized (step 612). By way of example, the authorization protocol may correspond to OAuth or an equivalent authorization protocol. In this example, the communication device 108 of the user may be redirected, at least temporarily, from the server 112 to a different server or website to present the user's login credentials (e.g., for communications between the server 112 and the different server/website using OAuth, etc.).

The communication device 108 of the user may then be returned to the server 112 along with the appropriate login credentials (e.g., OAuth token, username, etc.). During the authorization process, the server 112 or other access control application/server may receive the login credentials (step 616). The method 600 may continue by validating user information (e.g., a user's email address, etc.) by sending a validation request to the email address or email server 124 associated with the user's email address (step 620). This process may be substantially similar, if not identical, to the validation request described in conjunction with FIGS. 3-5 above.

The method 600 proceeds by receiving a validation response of the login credentials from the email server 124 (step 624). The validation response may be similar, if not identical, to the validation response, or response, described in conjunction with FIGS. 3-5 above.

In the event that the credentials are validated, as described above, the method 600 may continue by generating an authorization code and access token based on the validation (step 628). This access token may allow access according to the authorization process or protocol (step 632). The access token may be associated with the user and/or communication device 108 for use during a particular communication session established with the server 112. Additionally or alternatively, the access token may allow access to one or more restricted or protected resources of the server 112 during a time period associated with the access token. The restricted or protected resources may correspond to resources that are unavailable to a communication device 108 or user without identity (e.g., email address validation, etc.).

In some embodiments, the method 600 may continue by determining whether the access token is still valid (step 636). As can be appreciated, the methods and systems disclosed herein may further provide secure access by controlling a lifetime associated with an access token. The lifetime of the access token may be based on a time period, a particular communication session, a one-time use, password rules, etc., and/or combinations thereof. As long as the access token is still valid, the user may access the one or more protected resources via the communication device 108.

In the event that the communication session ends, times out, or otherwise invalidates the access token, the method 600 ends at step 640.

Figure 7:
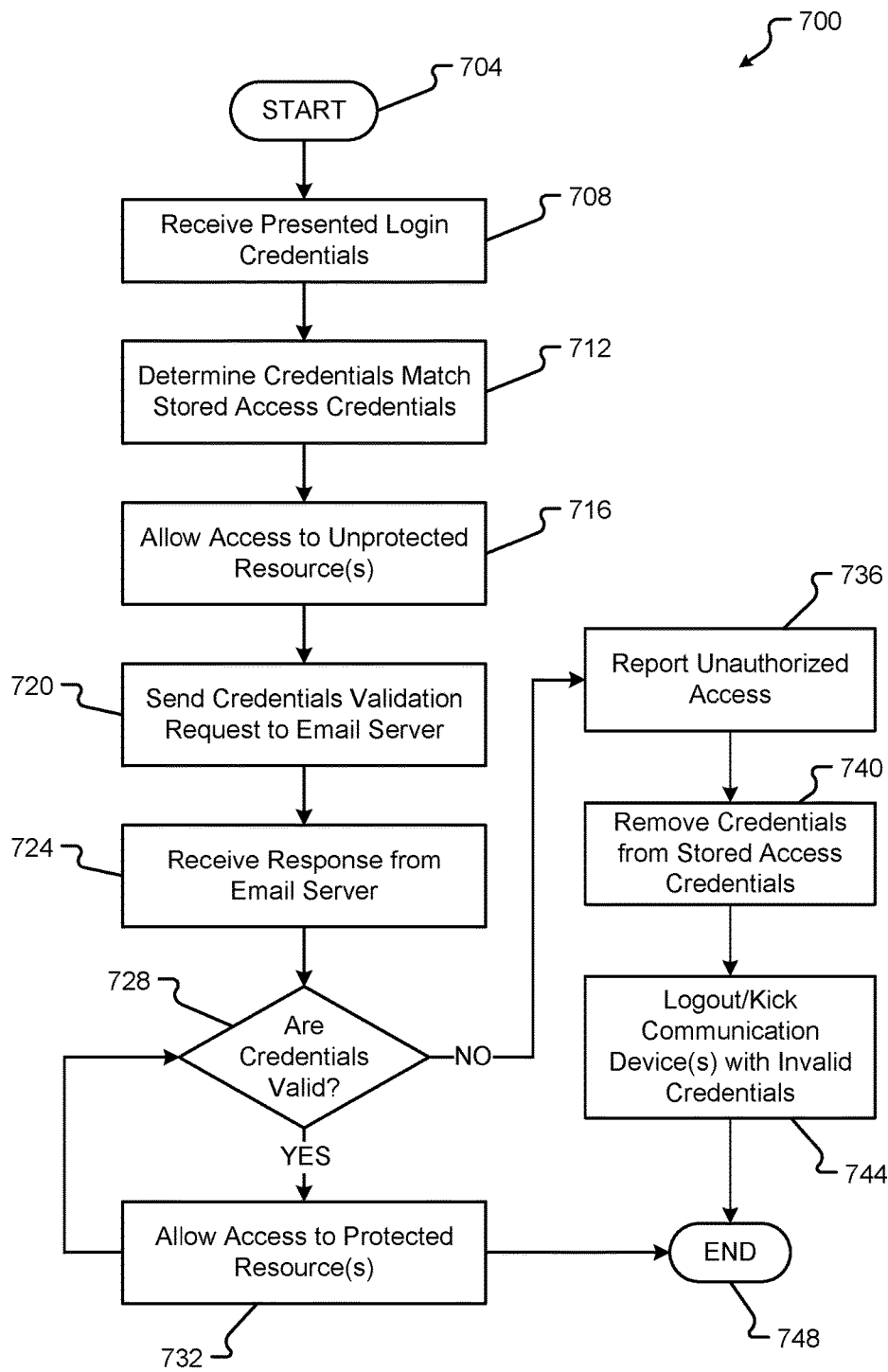
FIG. 7 is a flow diagram depicting a third method of securing account access in accordance with at least some embodiments of the present disclosure.

FIG. 7 is a flow diagram depicting a third method 700 of securing account access in accordance with at least some embodiments of the present disclosure. The method 700 can be executed as a set of computer-executable instructions executed by a computer system and encoded or stored on a computer readable medium. Hereinafter, the method 700 shall be explained with reference to the systems, components, modules, applications, software, data structures, user interfaces, etc. described in conjunction with FIGS. 1-6. The method 700 begins at step 704 and proceeds when presented login credentials are received (step 708). In some embodiments, the login credentials may be received at a server 112, an authorization application 136, or access control server 120 of a communication system 100. The login credentials may include one or more usernames, passwords, tokens, identifications, and/or any other information as provided herein.

The method 700 may proceed by determining whether the login credentials match stored access credentials (step 712). The stored access credentials may correspond to a username and/or password associated with a registered user of a server 112 or website. As provided above, the username may be an email address or unique identifier of the user. In some embodiments, the username may be created during a one-time registration process between the user and the website. These access credentials may be stored in a memory associated with the server 112 or website.

In the event that the login credentials match the stored access credentials, the method 700 may continue by allowing the communication device 108 of the user to access unprotected resources of the server 112 (step 716). The unprotected resources may correspond to the resources that are available only to users providing correct login credential information. If the access credentials fail to match the stored access credentials, or if incorrect login credential information is provided, the method 700 may end. It is an aspect of the present disclosure that the access to the unprotected resources may be granted, or allowed, by the server 112 at least temporarily. For example, the access to unprotected resources may be provided while the server 112 or access control application/server attempts to validate the email address associated with the user.

While the communication device 108 of the user is allowed to access the unprotected resources, the method 700 continues by determining the email server 124 and/or email address associated with the credentials. The method 700 proceeds by sending a validation request to the email address and/or email server 124 determined (step 720). The validation request may take form of an email, message, or other information exchange between an access control or authorization application/module (e.g., running on an access control server 120, network site server 112, or other computer system, etc.) and the email server 124. For example, the validation request may be similar, if not identical, to the validation request described in conjunction with FIGS. 3-6 above.

In some embodiments, the method 700 may receive a response from the email server 124 (step 724). The response may be made by the email server 124 based on the request sent in step 720. The response may indicate whether the credentials are valid or invalid. For instance, when the request sent is a "MAIL FROM" request, the response may be a "RCPT TO" message from the email server 124. As another example, when the request sent is an email (e.g., from an authorization email address and system, etc.) to the user's email address on the email server 124, the email server 124 may respond with a "message delivered" or "message bounced" response. In yet another example, a lack of a response from an email server 124 may be considered a response from the server 124. For instance, when an email is delivered successfully, the email server 124 may not return an "undeliverable" or "bounce" message.

Next, the method 700 proceeds by determining whether the credentials are valid, or have been validated by the email server 124 (step 728). Validation of the credentials may include determining if an email address exists on the email server 124, is associated with a particular user, fulfills criteria required of the email address, etc., and/or combinations thereof. The methods provided herein require a validation of the email address by the email server 124 to allow access to one or more restricted or protected resources of a server 112. In one embodiment, the validation may only require that the email exist, or be found on a particular email server 124. In some embodiments, the validation may require that the email address has not been changed or reassigned to another user. Additionally or alternatively, the validation may require that a user's password remain unchanged, or change according to a specific timed period.

If the validation of the credentials fails (e.g., determining that a bounced message response is received, no "RCPT TO" response is received, the email address does not exist, the password associated with the email address changed, the email address was reassigned to a different user, etc.), the method 700 may proceed to step 736 where one or more corrective actions are taken. The corrective actions may be made by the server 112, an access control application/server, etc. In any event, the user is prevented access to any protected resource of the server 112 if the credentials are invalid. The corrective action may include reporting an unauthorized access attempt by the user (step 736), removing a registration of the user and email address with the server 112 and/or stored access credentials (step 740), and/or logging out or "kicking" the user from any established communication session (e.g., requiring the user to login to the server 112 using new or correct information, credentials that can be validated, etc., and/or the like).

In the event that the credentials are validated (e.g., determining that a message delivered response is received, no message failure response is received, a "RCPT TO" response is received, the email address exists, the password change rules are followed, etc.) at step 728, the method 700 may proceed to allow access to one or more protected resources associated with the server 112 (step 732). In some embodiments, the method 700 may continue to determine whether the credentials are still valid by returning to step 728. The method 700 ends at step 748.

Figure 8:
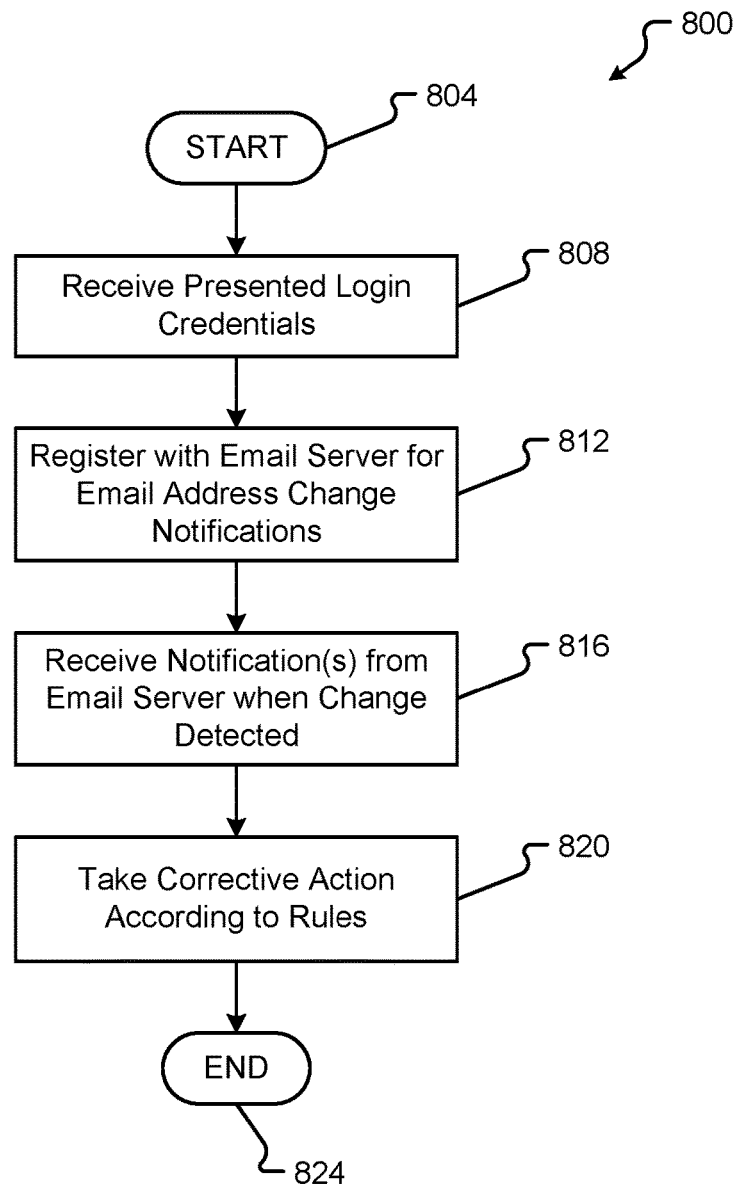
FIG. 8 is a flow diagram depicting a fourth method of securing account access in accordance with at least some embodiments of the present disclosure.

Referring now to FIG. 8, a fourth method 800 of securing account access will be described in accordance with at least some embodiments of the present disclosure. The method 800 can be executed as a set of computer-executable instructions executed by a computer system and encoded or stored on a computer readable medium. Hereinafter, the method 800 shall be explained with reference to the systems, components, modules, applications, software, data structures, user interfaces, etc. described in conjunction with FIGS. 1-7. The method 800 begins at step 804 and proceeds when presented login credentials are received (step 808). In some embodiments, the login credentials may be received at a server 112, an authorization application 136, or access control server 120 of a communication system 100. The login credentials may include one or more usernames, passwords, tokens, identifications, and/or any other information as provided herein.

The method 800 may proceed by the server 112, or an authorization component thereof, registering with an email server associated with the login credentials of the user for notifications when one or more portions of the user's credentials change (step 812). In some embodiments, the presumptive validity of a user's credentials may depend on the credential information remaining unchanged. In one embodiment, some changes may be acceptable, or even required, while other changes to credentials are not permitted in secure access verification. In any event, the server 112 may receive notifications (e.g., push notifications, etc.) from the email server 124 when any changes are made to the credential information or detected by the email server 124 (step 816).

Upon receiving a notification that credential information has changed, the server 112 may proceed to take corrective action (step 820). The corrective action may correspond to any of the corrective actions previously described. For example, when a change is made to a user's email address, or if the email address is removed from an email server, the email address may no longer be validated as secure. In another example, when the password information associated with a user's email address changes, the email address may no longer be validated as secure. In this example, the email address may have been reassigned to another user, and as such, cannot be used to represent the original user. As a protective measure, the server 112 may require the user to enter new information or login with new information to be validated. In some embodiments, the user accessing the server 112 through a user account may be automatically logged out of the server 112 and/or reported as described above. The method 800 ends at step 824.

Any of the steps, functions, and operations discussed herein can be performed continuously and automatically.

The exemplary systems and methods of this disclosure have been described in relation to conferences and communication systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

What is claimed is:

1. A communication system, comprising:
 a server, comprising:
  a microprocessor; and
  a computer readable medium coupled to the microprocessor and comprising instructions stored thereon that cause the microprocessor to:
   determine, based on login credentials presented to the server, an email address of a user associated with the login credentials;
   establish an electronic mail transfer protocol connection across a communication network between the server and an email server of an email provider of the email address of the user;
   send, across the communication network via the electronic mail transfer protocol connection, an electronic mail transfer protocol command to the email server, wherein the electronic mail transfer protocol command to generates a validation response message by the email server, and wherein the validation response message identifies whether the email address of the user is present and active at the email server of the email provider;
   automatically generate an access token associated with the user when the validation response message received by the server identifies that the email address of the user is present and active at the email server of the email provider, wherein the access token enables access to a protected resource by a communication device of the user during a lifetime of the access token, and wherein the protected resource is unavailable to the communication device of the user without the access token; and prevent access to the protected resource by the communication device of the user when the validation response message identifies that the email address of the user is neither present nor active at the email server of the email provider.

2. The communication system of claim 1, wherein the server sends a message to the email server configured to query the email server whether a password for the email address has changed between a first validation time and a second validation time.

3. The communication system of claim 1, wherein the server sends an email to the email address of the user.

4. The communication system of claim 3, wherein the email sent by the server is configured to generate a bounce message reply by the email server when the email address of the user is neither present nor active at the email server of the email provider.

5. The communication system of claim 1, wherein the electronic mail transfer protocol connection is SMTP and the electronic mail transfer protocol command is a series of SMTP commands.

6. The communication system of claim 1, further comprising:

a network interface that enables the microprocessor to present the access token to the communication device of the user.

7. The communication system of claim 1, wherein the access token is generated in response to receiving a first validation response message from the email server at a first time that the email address of the user is present and active at the email server of the email provider, and wherein the microprocessor is further caused to:

allow access to an unprotected resource of the server by the communication device of the user until a second validation response message is received from the email server at a second time identifying that the email address of the user is neither present nor active at the email server of the email provider.

8. The communication system of claim 1, wherein the lifetime of the access token corresponds to one or more of a time associated with a single communication session established between the communication device of the user and the server or a predetermined period of time.

9. A method, comprising:

receiving, by a microprocessor, login credentials from a communication device of a user;

determining, by the microprocessor and based on the login credentials received, an email address of the user associated with the login credentials;

establishing an electronic mail transfer protocol connection across a communication network between the server and an email server of an email provider of the email address of the user;

sending, by the microprocessor via the electronic mail transfer protocol connection, an electronic mail transfer protocol command to the email server, wherein the electronic mail transfer protocol command is configured to generate a validation response message by the email server;

receiving, by the microprocessor, the validation response message from the email server indicating whether the email address of the user is present and active at the email server of the email provider; and generating, automatically by the microprocessor, an access token associated with the user when the validation response message indicates that the email address of the user is present and active at the email server of the email provider, wherein the access token enables access to a protected resource by the communication device of the user during a lifetime of the access token, and wherein the protected resource is unavailable to the communication device of the user without the access token.

10. The method of claim 9, further comprising:

preventing, automatically by the microprocessor, access to the protected resource of the server by the communication device of the user when the validation response message indicates the email address of the user is neither present nor active at the email server of the email provider.

11. The method of claim 10, wherein the electronic mail transfer protocol command is sent to the email server and not to the email address of the user.

12. The method of claim 10, wherein the server sends a registration message requesting the server receive push notifications from the email server when any changes are made to the email address or a password of the email address of the user.

13. The method of claim 10, wherein the server sends an email sent to the email address of the user.

14. The method of claim 13, wherein in response to the email sent by the server to the email server, the server receives a bounce message, the bounce message indicating that the email address of the user is neither present nor active at the email server of the email provider.

15. The method of claim 10, wherein the access token is generated in response to receiving a first validation response message from the email server at a first time that the email address of the user is present and active at the email server of the email provider, the method further comprising:

allowing, by the microprocessor, access to an unprotected resource of the server by the communication device of the user until a second validation response message is received from the email server at a second time identifying that the email address of the user is neither present nor active at the email server of the email provider.

16. The method of claim 10, wherein the lifetime of the access token corresponds to one or more of a time associated with a single communication session established between the communication device of the user and the server or a predetermined period of time.

17. The method of claim 12, wherein changes are made to the email address and a push notification is received from the email server, wherein the push notification indicates that the email address of the user is no longer present nor active at the email server of the email provider.

18. The method of claim 17, further comprising:

performing, by the microprocessor, a corrective action, the corrective action comprising one or more of removing the email address of the user from a registration database of the server, logging the user out of a user account on the server, or reporting an unauthorized login attempt by the email address of the user.

19. A server, comprising:

a processor;

a network interface; and a computer-readable medium, coupled with the processor, the computer-readable medium comprising instruction sets that are executable by the processor, wherein the instruction sets cause the processor to:

receive login credentials provided in an account authorization between a communication device of a user and the server;

determine, based on login credentials, an email address of the user associated with the account;

establish an electronic mail transfer protocol connection across a communication network and via the network interface between the server and an email server of an email provider of the email address of the user;

send, across a communication network via the electronic mail transfer protocol connection, an electronic mail transfer protocol command to the email server, wherein the electronic mail transfer protocol command generates a validation response message by the email server, and wherein the validation response message identifies whether the email address of the user is present and active at the email server of the email provider;

automatically create an access token associated with the user and the account when the validation response message received by the server identifies that the email address of the user is present and active at the email server of the email provider, wherein the access token enables access to a protected resource by the communication device of the user during a lifetime of the access token, wherein the protected resource is unavailable to the communication device of the user without the access token; and prevent access to the protected resource by the communication device of the user when the validation response message identifies that the email address of the user is neither present nor active at the email server of the email provider.

20. The server of claim 19, wherein the account authorization between the communication device of the user and the server is an open authorization protocol, and wherein the login credentials are determined from an authorization token provided as part of the open authorization protocol.

\* \* \* \* \*

UNITED STATES PATENT AND TRADEMARK OFFICE
CERTIFICATE OF CORRECTION

PATENT NO. : 10,218,701 B2
APPLICATION NO. : 15/065557
DATED : February 26, 2019
INVENTOR(S) : Anand Bernard Alen et al.

It is certified that error appears in the above-identified patent and that said Letters Patent is hereby corrected as shown below:

In the Claims

At Column 24, Line 53, Claim 1 after "protocol command" delete "to" therein.

Signed and Sealed this
Thirtieth Day of April, 2019

Andrei Iancu
*Director of the United States Patent and Trademark Office*